( 12 ) United States Patent
Yamamoto et al.

(10) Patent No.: US 11,231,721 B2
(45) Date of Patent: Jan. 25, 2022

(54) MARKER SYSTEM AND OPERATION METHOD (71) Applicant: AICHI STEEL CORPORATION, Tokai (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 301 days.

(21) Appl. No.: 16/618,172

(22) PCT Filed: Jun. 4, 2018

(86) PCT No.: PCT/JP2018/021351
§ 371 (c)(1),
(2) Date: Nov. 29, 2019

(87) PCT Pub. No.: WO2018/225677
PCT Pub. Date: Dec. 13, 2018

(65) Prior Publication Data
US 2020/0110420 A1 Apr. 9, 2020

(30) Foreign Application Priority Data
Jun. 6, 2017 (JP) .............................. JP2017-111426

(51) Int. Cl.
*G08G 1/042* (2006.01)
*G05D 1/02* (2020.01)
(Continued)

(52) U.S. Cl.
CPC ............. *G05D 1/0261* (2013.01); *E01F 9/30* (2016.02); *E01F 11/00* (2013.01); *G08G 1/042* (2013.01);
(Continued)

(58) Field of Classification Search
CPC .................................................. G05D 1/0261
See application file for complete search history.

(56) References Cited

U.S. PATENT DOCUMENTS 6,345,217 B1 * 2/2002 Zeitler ................. G05D 1/0261
318/587
9,864,379 B2 * 1/2018 Zheng .................. G05D 1/0259
(Continued)

FOREIGN PATENT DOCUMENTS

CN 104897177 A * 9/2015 ............... G05D 1/00
EP 3467437 A1 4/2019
(Continued)

OTHER PUBLICATIONS

Extended European search report dated Dec. 9, 2020, in corresponding European patent Application No. 18813435.7, 9 pages.
(Continued)

*Primary Examiner* — Shelley Chen
(74) *Attorney, Agent, or Firm* — Xsensus LLP (57) ABSTRACT

In an operation method of marker system (1) in which laying position information indicating a position where a magnetic marker (10) is laid is provided to a vehicle (3) side for achieving control for assisting driving of the vehicle (3) by using the magnetic marker (10), since positional accuracy required when laying magnetic markers (10) can be relaxed, the laying position information of the magnetic marker (10) positioned on the vehicle (3) side which performs the control for assisting driving is used as correction information to correct the laying position information indicating the position where the magnetic marker (10) is laid, and laying cost of magnetic markers (10) can be suppressed.

10 Claims, 10 Drawing Sheets (51) Int. Cl.
    *E01F 9/30*     (2016.01)
    *E01F 11/00*    (2006.01)
    *B60W 30/12*    (2020.01)
    *B62D 15/02*    (2006.01)
(52) U.S. Cl.
    CPC ......... *B60W 30/12* (2013.01); *B60W 2556/45* (2020.02); *B62D 15/025* (2013.01); *G05D 2201/0213* (2013.01)

(56) References Cited

U.S. PATENT DOCUMENTS

2014/0309812 A1    10/2014  Lee et al.
2017/0003688 A1\*  1/2017  Zheng ..................... G05D 1/00

FOREIGN PATENT DOCUMENTS

| JP | 10-160493 A | | 6/1998 |
| JP | 2000-276691 A | | 10/2000 |
| JP | 2000276691 A | \* | 10/2000 |
| JP | 2002-260156 A | | 9/2002 |
| JP | 2005-202478 A | | 7/2005 |
| JP | 2006-165973 A | | 6/2006 |
| JP | 2011-129049 A | | 6/2011 |

OTHER PUBLICATIONS

International Search Report and Written Opinion dated Jul. 24, 2018 for PCT/JP2018/021351 filed on Jun. 4, 2018, 8 pages including English Translation of the International Search Report.

\* cited by examiner

MARKER SYSTEM AND OPERATION METHOD

CROSS-REFERENCE TO RELATED APPLICATIONS

The present application is based on PCT filing PCT/JP2018/021351, filed Jun. 4, 2018, which claims priority to JP 2017-111426, filed Jun. 6, 2017, the entire contents of each are incorporated herein by reference.

TECHNICAL FIELD

The present invention relates to a marker system for using a magnetic marker laid in a road and an operation method thereof.

BACKGROUND ART

Conventionally, a magnetic marker detection system for a vehicle that detects magnetic markers laid on a road by a magnetic sensor attached to the vehicle is known (see, for example, Patent Literature 1). By using such a magnetic marker detection system, automatic driving can be achieved in addition to various types of driving assist such as, for example, automatic steering control or lane departure warning using magnetic markers laid along a lane.

CITATION LIST

Patent Literature

Patent Literature 1: Japanese Unexamined Patent Application Publication No. 2005-202478

SUMMARY OF INVENTION

Technical Problem

However, the conventional magnetic marker has the following problems. For example, in order to achieve driving assist such as lane departure warning or automatic steering control, it is necessary to lay a large number of magnetic markers at relatively short spacings with high positional accuracy, and hence there is a problem in which the laying cost tends to increase.

The present invention has been made in view of the conventional problems, and an object of the present invention is to provide a marker system and an operation method that can suppress the laying cost of magnetic markers.

Solution to Problem

One aspect of the present invention resides in a marker system operation method for achieving control for assisting driving of a vehicle by using a magnetic marker, the method providing a vehicle side with laying position information indicating a position where the magnetic marker is laid, wherein
the laying position information of the magnetic markers is corrected by using, as correction information, the position of the magnetic marker measured on the vehicle side which performs the control for assisting driving.

One aspect of the present invention resides in a marker system for achieving control for assisting driving of a vehicle by using magnetic markers, the marker system providing a vehicle side with laying position information indicating positions where the magnetic markers are laid, the system including,
a storage device which stores the laying position information, and
a processing circuit which acquires measured position information indicating positions measured on the vehicle side which performs the control for assisting driving, and executes an arithmetic process of correcting the laying position information stored in the storage device by using, as correction information, the positions indicated by the measured position information.

Advantageous Effects of Invention

According to the present invention, after the magnetic markers are laid, accuracy of the laying position information can be improved through a use of the magnetic marker by the vehicle. Therefore, according to the present invention, it is possible to reduce a necessity of laying the magnetic markers with high accuracy at predetermined positions determined by design or the like, and to reduce the cost required for laying.

As described above, the marker system and the operation method of the present invention are the system or the operation method that is effective for suppressing the laying cost of the magnetic markers.

DESCRIPTION OF EMBODIMENTS

As for the positioning unit in the present invention, there is for example, a unit that uses a GPS (Global Positioning System) that measures an absolute position or an IMU (Inertial Measurement Unit) that measures a relative position by inertial navigation calculation, or the like. In particular, if positioning is performed by RTK (RealTime Kinematic) GPS or the like, the absolute position can be positioned with high accuracy. However, GPS, which is premised on receiving GPS radio waves, is not suitable for positioning such as in tunnels or on roads that run between tall buildings. Positioning by inertial navigation calculation is possible even in places unsuitable for receiving GPS radio waves for example in tunnels. Therefore, it is preferable to employ the positioning unit that combines positioning by GPS and positioning by inertial navigation calculation.

Embodiments

The embodiment of the present invention will be specifically described with reference to the following embodiment.

First Embodiment

This embodiment is an example relating to a marker system 1 that uses a magnetic marker 10 for driving assist control on a vehicle 3 side and an operation method of the system. The details of this are described with reference to FIG. 1 to FIG. 10.

The operation method of the marker system 1 of this embodiment is the operation method for collecting information of a position of the magnetic marker 10 from the vehicle 3 side during the operation of the marker system 1, and improving accuracy of laying position information stored in a marker database (marker DB) 25. The marker system 1 is configured to include the magnetic marker 10 laid in a road and a server device that distributes to the vehicle 3 the laying position information indicating the position where the magnetic marker 10 is laid.

In the followings, configurations of (1) the magnetic marker, (2) a laying work vehicle for laying magnetic markers, (3) a vehicle for performing the driving assist control, and (4) the server device will be described in order, and then (5) the operation method of the marker system will be described.

(1) Magnetic Marker

Figure 2:
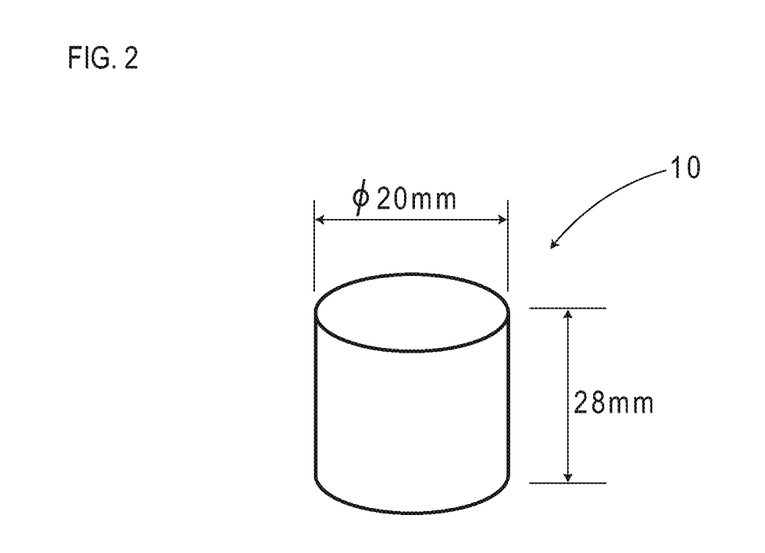
FIG. 2 is a diagram depicting a magnetic marker.

The magnetic marker 10 is a small-sized marker forming a columnar shape having a diameter of 20 mm and a height of 28 mm, as depicted in FIG. 2. A magnet forming the magnetic marker 10 is an isotropic ferrite plastic magnet formed by dispersing a magnetic powder of iron oxide as a magnetic material in a polymer material as a base material, and has a characteristic of a maximum energy product (BHmax)=6.4 kJ/m$^3$.

The magnet of the magnetic marker 10 is a magnet with a magnetic flux density of the surface being 45 mT (millitesla) and a magnetic flux density reaching a height of 250 mm being on the order of 8 µT. Since the magnetic material of the magnet as an isotropic ferrite plastic magnet is iron oxide, the magnet is resistant to corrosion, and is not required to be accommodated in a metal-made case or the like. The magnetic marker 10 can be directly accommodated and laid in a small hole having, for example, a diameter of 25 to 30 mm and a depth on the order of 35 to 40 mm.

(2) Laying Work Vehicle

Figure 3:
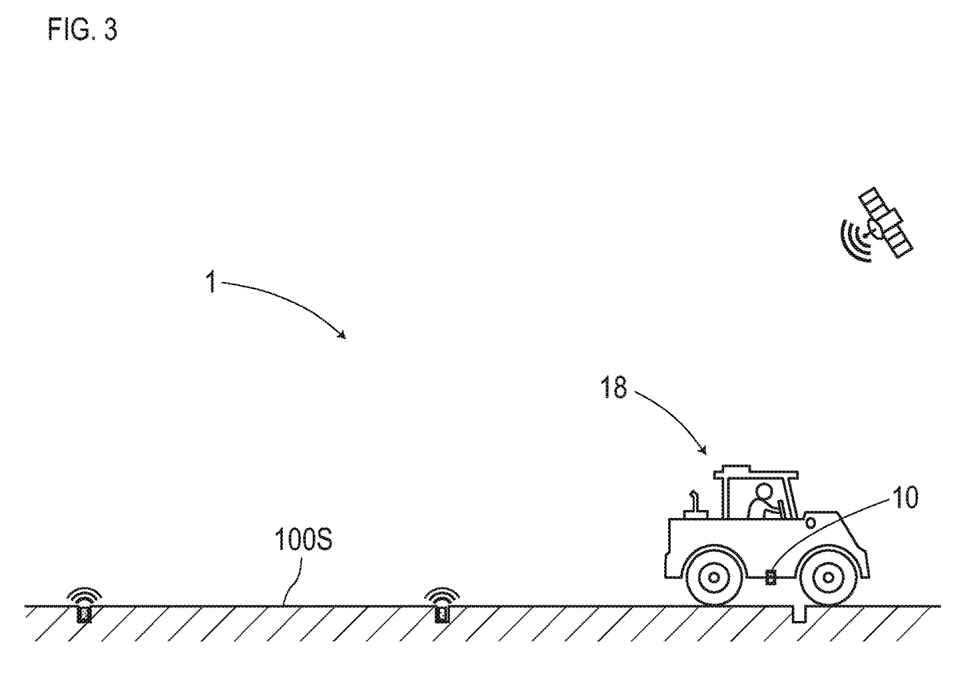
FIG. 3 is a descriptive diagram of laying work.

Laying work of the magnetic marker 10 is performed by, for example, a laying work vehicle 18 depicted in FIG. 3, which is driven by a driving operation of a driving operator. Although not depicted in the figure, the laying work vehicle 18 includes a pallet as a container box for the magnetic markers 10, a unit that provides accommodation holes on a road surface 100S, a unit that arranges the magnetic markers 10 contained in the pallet one by one into the accommodation holes, a unit for supplying filler to the accommodation holes into which the magnetic markers 10 are arranged, and so forth. By using the laying work vehicle 18 including these units and so forth, it is possible to perform a series of works with one vehicle from boring of the accommodation holes for the magnetic markers 10 to a finishing process after arranging the magnetic markers 10.

The laying work vehicle 18 in the laying work mode automatically performs the laying work of the magnetic markers 10 every time a travel distance obtained by integrating a vehicle speed reaches a certain distance while traveling at a low speed by driving operation of the driving operator.

Although not depicted in the figure, the laying work vehicle 18 has, in addition to a positioning unit that measures the position using GPS and inertial navigation calculation, a hard disk device as a storage medium for storing information that indicates the laying position of the magnetic marker 10. The positioning unit measures the position where the magnetic marker 10 is laid by combining positioning by GPS and positioning by inertial navigation calculation.

When the magnetic marker 10 is laid by the laying work vehicle 18, the laying position information indicating the position where the magnetic marker 10 is laid is sequentially stored in the hard disk device. Thereby, on the laying work vehicle 18, a database of the laying position information indicating the position where each magnetic marker 10 is laid is generated. Note that this database of the laying position information is transferred to the server device 2 which is explained later and forms the marker DB 25.

(3) Vehicle for Performing Driving Assist Control

Figure 5:
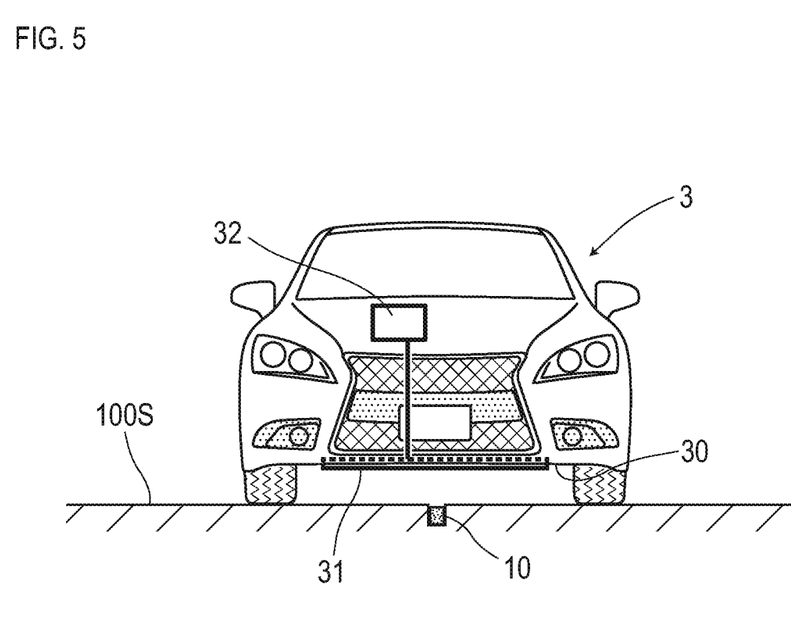
FIG. 5 is a front view of a vehicle provided with a sensor unit which detects the magnetic marker.

The vehicle 3 exemplarily described in FIG. 5 is a general vehicle that performs, as an example of control for assisting driving, control such as route guidance to a destination. This vehicle 3 can identify a position of own vehicle (own vehicle position) with high accuracy by using the magnetic marker 10 and is capable of performing route guidance with high accuracy.

Figure 4:
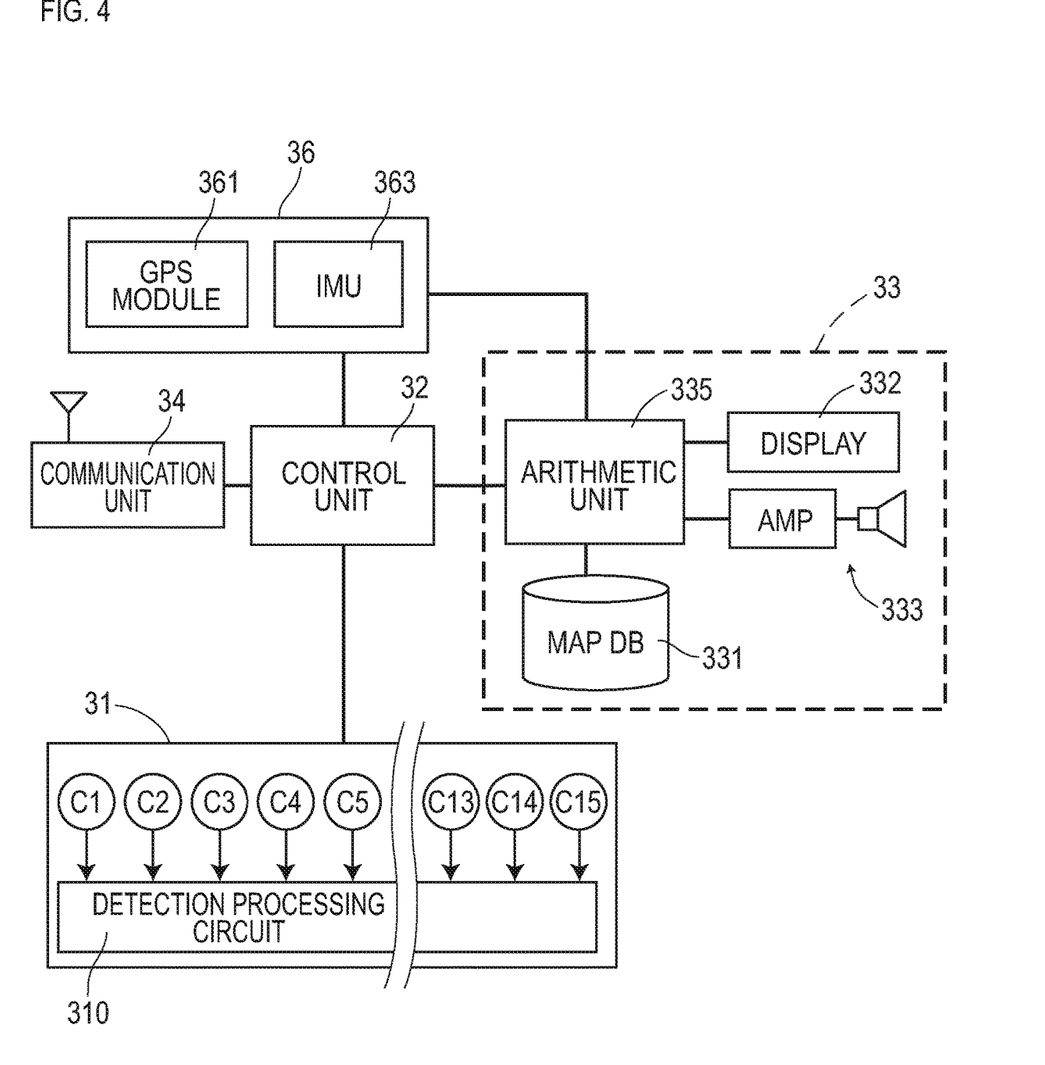
FIG. 4 is a block diagram depicting configuration on vehicle side.

As depicted in FIG. 4, the vehicle 3 includes a sensor unit 31 that detects the magnetic marker 10, the positioning unit 36 that measures the position, a control unit 32 that inputs the own vehicle position to a navigation device 33, the navigation device 33, and so forth. The navigation device 33 is configured to include a map DB 331 that stores map data, a display 332 that displays a map, an AMP/speaker 333 that outputs guidance voice, and an arithmetic unit 335 that executes map drawing process, route calculation, and so forth. The vehicle 3 includes a communication unit 34 and is capable of being wirelessly connected to a public network such as an Internet 15 (see FIG. 1).

The arithmetic unit 335 configuring the navigation device 33 is a unit configured to include a CPU (central processing unit) that executes various arithmetic processes and a memory element such as a ROM (read only memory) or a RAM (random access memory), and so forth. The arithmetic unit 335 includes at least two types of programs as route guidance execution programs.

A first program is a program that is executed when an own vehicle position of low accuracy is acquired, and a second program is a program that is executed when an own vehicle position of high accuracy can be acquired. In an operation mode by the first program, route guidance is performed on an assumption that an error is included, for example, in a distance to an intersection. In an operation mode by the second program, route guidance is performed on an assumption that, for example, a distance to a stop line at an intersection is accurately grasped.

The positioning unit 36 is a unit that performs positioning by combining positioning of an absolute position by GPS and positioning of a relative position by inertial navigation calculation. Note that the positioning unit 36 of this embodiment is set to output a position of the magnetic sensor C8 located at a center of the sensor unit 31 as a measured position.

Positioning of the absolute position is executed by a GPS module 361. The GPS module 361 is a module that captures a plurality of GPS satellites that transmit GPS radio waves and measures the absolute position based on a principle of triangulation. In principle, if three GPS satellites are captured, positioning by triangulation is possible. On the other hand, if a number of GPS satellites captured is large, accuracy of positioning improves due to an increase in a degree of freedom in selecting a combination of GPS satellites suitable for triangulation and so forth. Thus, the accuracy of positioning by GPS depends on the number of GPS satellites that can be captured simultaneously, and as the number that can be captured simultaneously increases, the higher the accuracy of the positioning becomes.

Positioning by inertial navigation calculation is executed by an IMU 363. The IMU 363 is a unit that includes a gyroscope that measures an azimuth and an acceleration sensor that measures acceleration. The IMU 363 calculates a displacement amount by second-order integration of acceleration, and estimates the relative position with reference to a reference position by integrating the displacement amount along an azimuth measured by the gyroscope. For example, in a place where GPS satellites cannot be captured, such as in a tunnel, the IMU 363 estimates the relative position using a position before the tunnel that has already been positioned using GPS as a reference position. Thus, measurement of the own vehicle position will be possible by adding the relative position to the reference position. Note that positioning by inertial navigation calculation has a characteristic that errors accumulate. Therefore, in positioning by inertial navigation calculation, an positioning error becomes large as a distance from the reference position increases, and the positioning error becomes small as the distance from the reference position decreases.

As depicted in FIG. 5, the sensor unit 31 is a unit mounted to a vehicle body floor 30 that corresponds to a bottom surface of the vehicle 3, and has a function as a detection device that detects the magnetic marker 10. The sensor unit 31 is arranged, for example, inside a front bumper. In the case of the vehicle 3 of this embodiment, a mounting height of the sensor unit 31 with reference to the road surface 100S is 200 mm. Note that in FIG. 5, the positioning unit 36, the communication unit 34, the navigation device 33, and so forth are not depicted in the figure.

As depicted in FIG. 4, the sensor unit 31 includes fifteen magnetic sensors Cn (n is an integer from 1 to 15) arranged at spacings of 10 cm along a vehicle width direction and a detection processing circuit 310 incorporating a CPU (not depicted) and so forth. The sensor unit 31 is mounted to the vehicle 3 such that the central magnetic sensor C8 among the fifteen magnetic sensors Cn is positioned at the center of the vehicle in the vehicle width direction.

The magnetic sensor Cn is an MI sensor that detects magnetism using a known MI effect (Magnet Impedance Effect) that an impedance of a magnetic sensitive body such as an amorphous wire changes sensitively according to an external magnetic field. The magnetic sensors Cn are configured so as to enable detection of a magnitude of magnetic components in two directions orthogonal to each other. In the sensor unit 31, the magnetic sensors Cn are incorporated so as to sense magnetic components in a forwarding direction and the vehicle width direction of the vehicle 3.

The magnetic sensors Cn achieve high sensitivity with a magnetic flux density measurement range of ±0.6 mT and a magnetic flux density resolution within the measurement range of 0.02 µT. As described above, the magnetic markers 10 act on the order of 8 µT of magnetism at the height of 250 mm, which is an upper limit of a range assumed as a mounting height of the sensor unit 31. With the magnetic sensors Cn having the magnetic flux density resolution of 0.02 µT, the magnetism of the order of 8 µT can be sensed with high reliability. With the sensor unit 31 having the mounting height of 200 mm in this embodiment, the magnetism of the magnetic marker 10 can be detected with a further sufficient margin.

Figure 6:
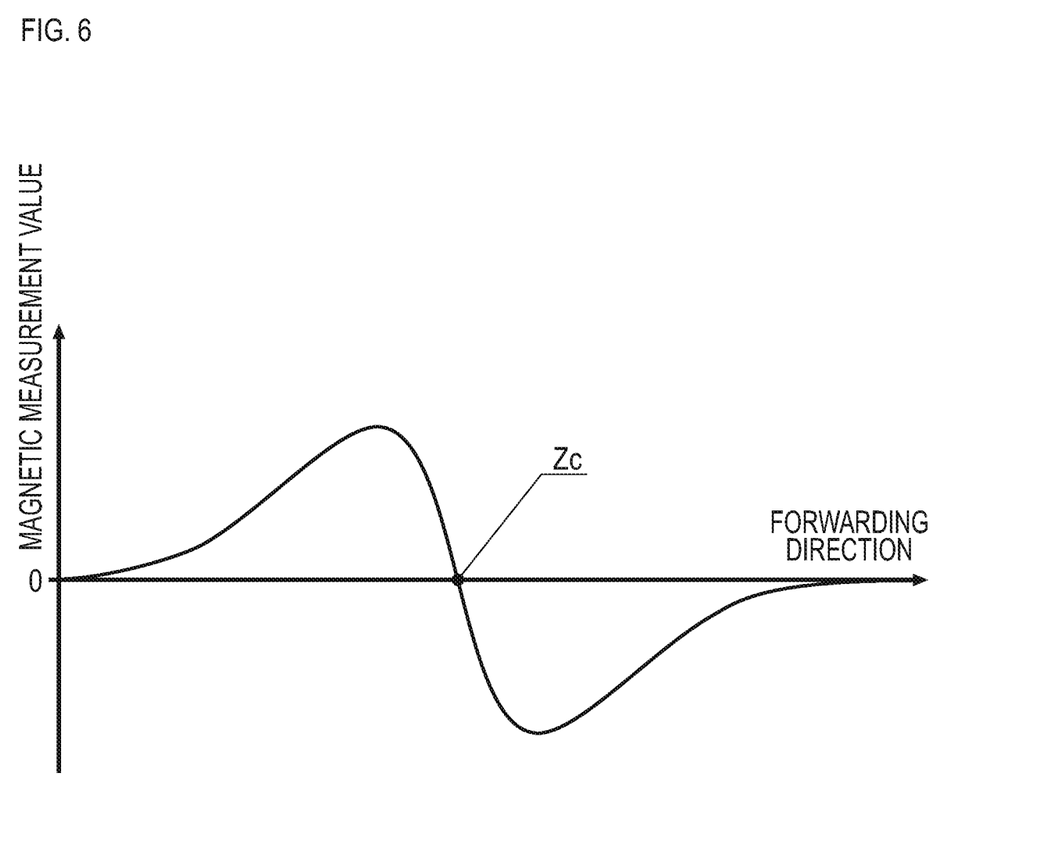
FIG. 6 is a descriptive diagram exemplarily depicting a change of a magnetic measurement value in a forwarding direction at the time of passage over the magnetic marker.

For example, when the magnetic sensor Cn moves in the forwarding direction and passes straight above the magnetic marker 10, a magnetic measurement value in the forwarding direction is reversed between positive and negative before and after the magnetic marker 10 as depicted in FIG. 6 and changes so as to cross zero at the position of the magnetic marker 10. While the vehicle 3 is traveling, regarding the magnetism in the forwarding direction detected by any of the magnetic sensors Cn, it can be determined that the magnetic marker 10 has been detected when a zero-cross Zc occurs, in which the magnetic measurement value changes between positive and negative.

Figure 7:
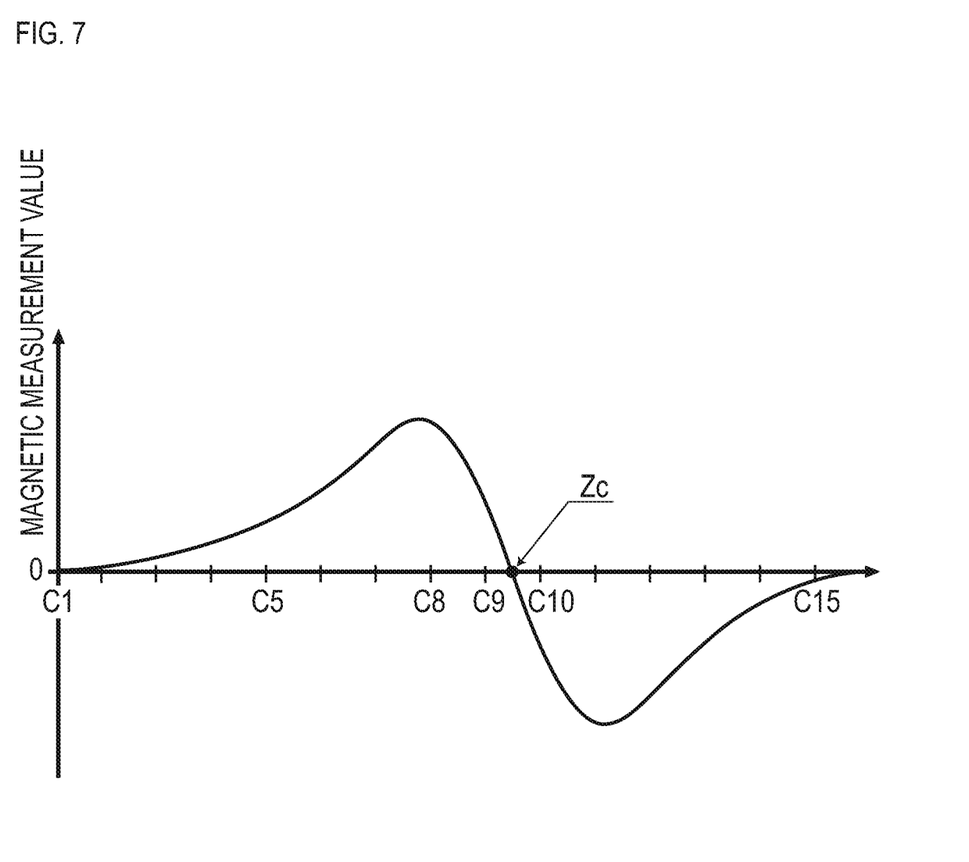
FIG. 7 is a descriptive diagram exemplarily depicting a distribution curve of magnetic measurement values in a vehicle width direction by magnetic sensors Cn arranged in the vehicle width direction.

Furthermore, for example, regarding a magnetic sensor having same specifications as the magnetic sensor Cn, a movement along a virtual line in the vehicle width direction passing straight above the magnetic marker 10 is assumed. In this assumption, the magnetic measurement value in the vehicle width direction is reversed between positive and negative on both sides across the magnetic marker 10 and changes to cross zero at the position of the magnetic marker 10. In the case of the sensor unit 31 in which fifteen magnetic sensors Cn are arranged in the vehicle width direction, as depicted in FIG. 7, the magnetism being positive or negative in the vehicle width direction detected by the magnetic sensors Cn varies depending on which side the magnetic sensor is present with reference to the magnetic marker 10.

Based on a distribution curve in FIG. 7 exemplarily depicting the magnetic measurement values in the vehicle width direction of each magnetic sensor Cn of the sensor unit 31, a position between adjacent two magnetic sensors Cn across the zero-cross Zc where the magnetism in the vehicle width direction is reversed between positive and negative, or a position straight below any of the magnetic sensors Cn where the detected magnetism in the vehicle width direction is zero and the magnetism of those on both outer sides of the magnetic sensor Cn is reversed between positive and negative is the position of the magnetic marker 10 in the vehicle width direction. The detection processing circuit 310 measures a deviation of the position of the magnetic marker 10 in the vehicle width direction with reference to the center position of the sensor unit 31 (the position of the magnetic sensor C8) as a lateral shift amount of the magnetic marker 10. For example, in the case of FIG. 7, the position of the zero-cross Zc is a position corresponding to C9.5, around a midpoint of C9 and C10. As described above, since a space between the magnetic sensors C9 and C10 is 10 cm, the lateral shift amount of the magnetic marker 10 is (C9.5–C8)×10 cm with reference to C8 positioned at the center of the sensor unit 31 in the vehicle width direction.

The detection processing circuit 310 of the sensor unit 31 is an arithmetic circuit that executes various arithmetic processes such as a process for determining the detection of the magnetic marker 10, and a process for measuring the lateral shift amount with reference to the magnetic marker 10 in the vehicle width direction, and so forth. This detection processing circuit 310 is configured to include a memory element such as a ROM or a RAM, and so forth in addition to the CPU that executes calculations. The detection processing circuit 310 acquires sensor signals output from each of the magnetic sensors Cn to execute various arithmetic processes, and generates marker detection information including that the magnetic marker 10 has been detected, as well as the lateral shift amount of the magnetic marker 10 with reference to the central magnetic sensor C8, and so forth. This marker detection information is input to the control unit 32.

The control unit 32 is a unit including an electronic substrate (not depicted in the figure) on which a memory element such as a ROM or a RAM, and so forth is mounted in addition to a CPU that executes various calculations. The control unit 32 inputs information on the own vehicle position, which is the position of the vehicle 3 necessary for route guidance, to the arithmetic unit 335 of the navigation device 33 as needed.

Figure 1:
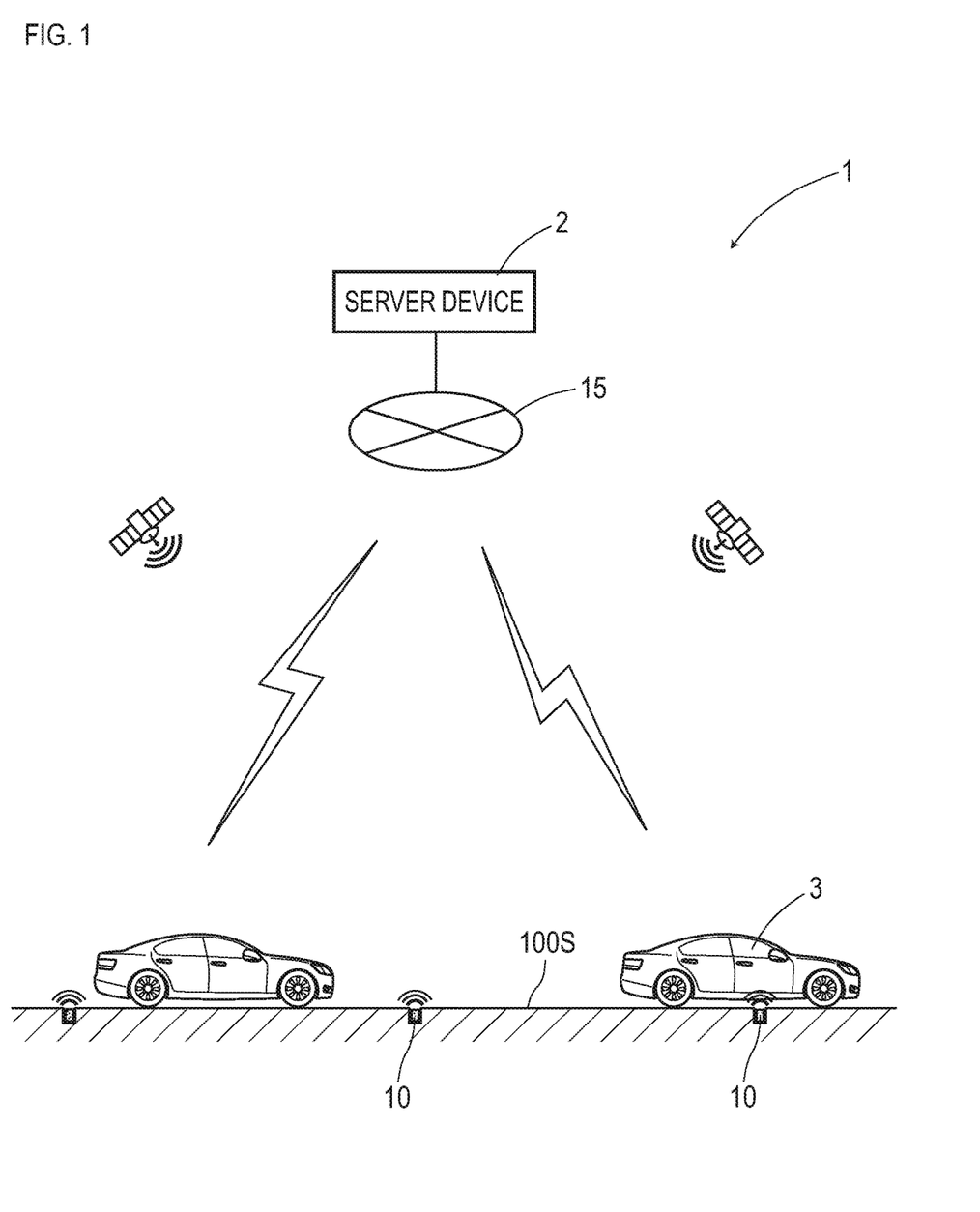
FIG. 1 is a system diagram of a marker system.

When the control unit 32 (FIG. 4) acquires the marker detection information indicating that the magnetic marker 10 has been detected, the control unit 32 transmits measured position information indicating the position of the magnetic marker 10 to the server device 2 (FIG. 1). The vehicle 3 that has transmitted the measured position information can receive in return the laying position information of the magnetic marker 10 from the server device 2. Note that the measured position information transmitted by the vehicle 3 is associated with information indicating accuracy of positioning, such as the number of GPS satellites captured during positioning and the distance from the reference position in positioning by inertial navigation calculation, and so forth. Note that in this information indicating the accuracy of positioning, the distance from the reference position is set to zero in the case of positioning by GPS, and the number of GPS satellites captured is set to zero in the case of positioning by inertial navigation calculation.

(4) Server Device

Figure 8:
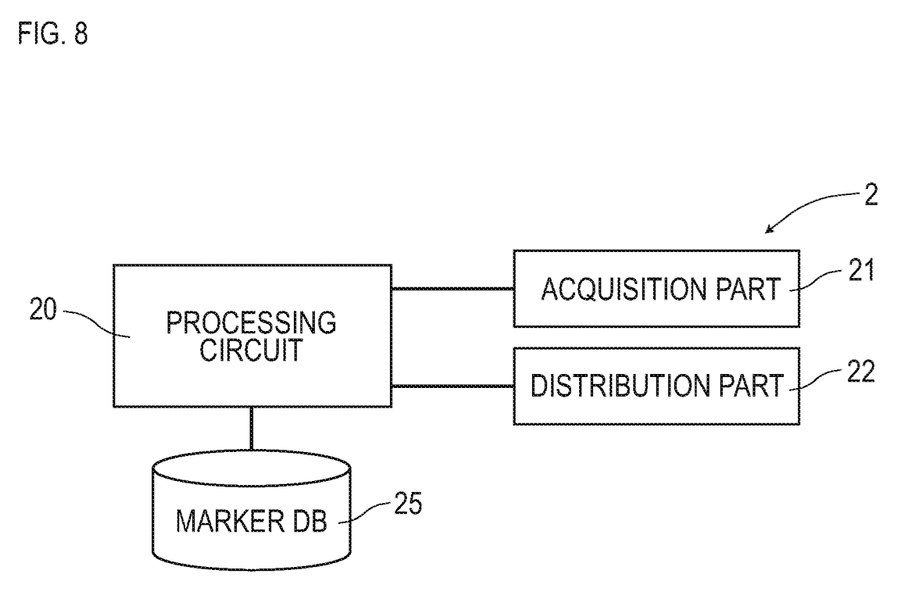
FIG. 8 is a block diagram depicting configuration of a server device.

The server device 2 can communicate with the vehicle 3 via the public communication network such as the Internet 15 as depicted in FIG. 1 and FIG. 8. The server device 2 includes a storage device 25 (hereinafter a marker DB 25) that stores the laying position information and functions as the marker DB, an acquisition part 21 that acquires the measured position information from the vehicle 3, a distribution part 22 that returns the laying position information of the magnetic marker 10 to the vehicle 3, and a processing circuit 20 that executes arithmetic process for correcting the laying position information based on the position indicated by the measured position information acquired from the vehicle 3. When laying the magnetic marker 10, the above-mentioned database regarding the magnetic marker 10 generated by the laying work vehicle 18 is transferred to the server device 2 and configures the marker DB 25. The accuracy of laying position information of each magnetic marker 10 stored in the marker DB 25 is improved through the subsequent operation of the marker system 1.

The processing circuit 20 is an execution circuit for arithmetic process that corrects the laying position information by using the position indicated by the measured position information acquired from the vehicle 3 as correction information. The processing circuit 20 counts the number of acquisitions of measured position information used for correction, and generates information indicating accuracy using the number of acquisitions. For example, until the above-mentioned number of acquisitions exceeds 1000, information indicating low accuracy is generated as information indicating the accuracy, and information indicating high accuracy is generated when the number exceeds 1000.

The distribution part 22 is configured to return the laying position information of the magnetic marker 10 to the vehicle 3 as the transmission source of the measured position information. This laying position information is associated with the above-mentioned information that indicates the accuracy of laying position information generated by the processing circuit 20 (high accuracy or low accuracy).

(5) Operation Method of Marker System

System operation of the marker system 1 differs depending on whether the vehicle 3 detects the magnetic marker 10 or not. Therefore, for example, the contents of the system operation are explained by assuming a route to a destination via a road where the magnetic markers 10 are not laid (referred to as an unlaid road) and then via a main road where the magnetic markers 10 are laid (referred to as marker laid road).

While the vehicle 3 is traveling on the unlaid road, route guidance is executed using the own vehicle position measured by the positioning unit 36. Note that the sensor unit 31 that executes the detection process of the magnetic marker 10 repeatedly outputs a process result as non-detection. The control unit 32 captures the measured position by the positioning unit 36 as the own vehicle position as needed, and inputs them to the arithmetic unit 335 of the navigation device 33. The arithmetic unit 335 generates guidance information according to the own vehicle position and the travelling direction on the route set in advance as described above, and for example, outputs route guidance such as "Turn right at the next intersection" by voice or the like.

Figure 9:
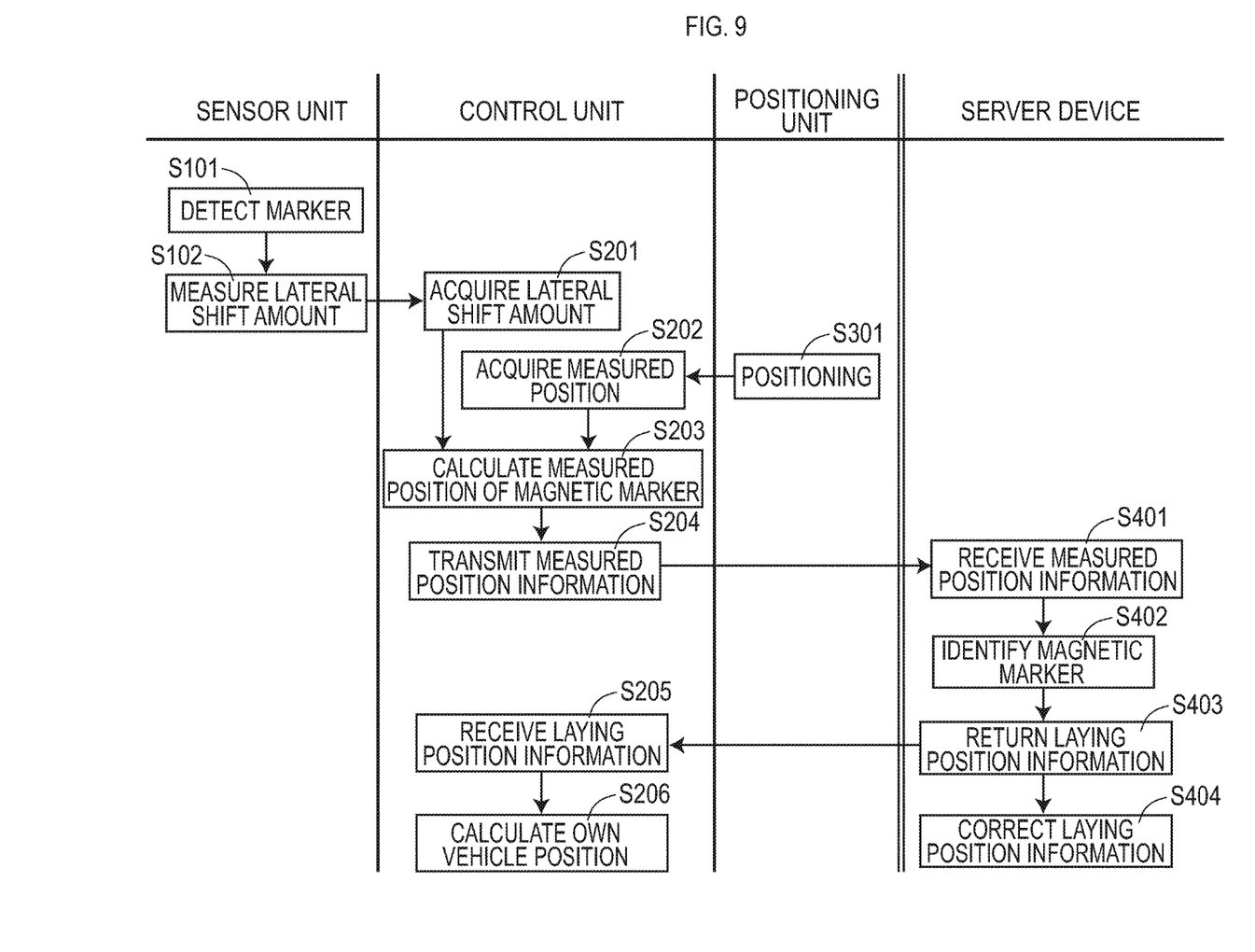
FIG. 9 is a descriptive diagram of an operation content of the marker system.

After that, when the vehicle 3 enters the marker laid road and the sensor unit 31 detects the magnetic marker 10 (S101) as depicted in FIG. 9, the above-mentioned marker detection information including the lateral shift amount of the magnetic marker 10 is input to the control unit 32 (S102→S201). Based on the lateral shift amount of the magnetic marker 10 and the measured position acquired from the positioning unit 36 operating parallelly (S301→S202), the control unit 32 calculates the position of the magnetic marker 10 (S203). Specifically, the control unit 32 calculates the measured position of the magnetic marker 10 by shifting the measured position by the positioning unit 36 (the position of the magnetic sensor C8) as much as the lateral shift amount measured by the sensor unit 31 in the vehicle width direction.

The control unit 32 transmits the measured position information position information indicating the measured position of the magnetic marker 10 obtained by the calculation to the server device 2 (S204). Note that this measured position information is associated with the information indicating the accuracy of positioning, such as the number of GPS satellites captured during positioning and the distance from the reference position in positioning by inertial navigation calculation, and so forth as described above.

When the server device 2 receives the measured position information from the vehicle 3 (S401), the server device selectively identifies the magnetic marker 10 positioned nearest to the position indicated by this measured position information (S402). Then, the server device 2 returns this laying position information of the magnetic marker 10 to the vehicle 3 (S403). In addition, the server device 2 executes a correction process for improving the accuracy of laying position information (S404).

When executing the correction process, the server device 2 first refers to information indicating the accuracy associated with the measured position information received in above-mentioned step S401. As described above, this information indicating the accuracy indicates the number of GPS satellites captured during GPS positioning, and the distance from the reference position in positioning by inertial navigation calculation. When this number of GPS satellites captured is less than four and also the distance from the reference position is more than 100 m, the server device 2 determines that the accuracy of measured position information is not sufficient and does not execute the correction process.

Figure 10:
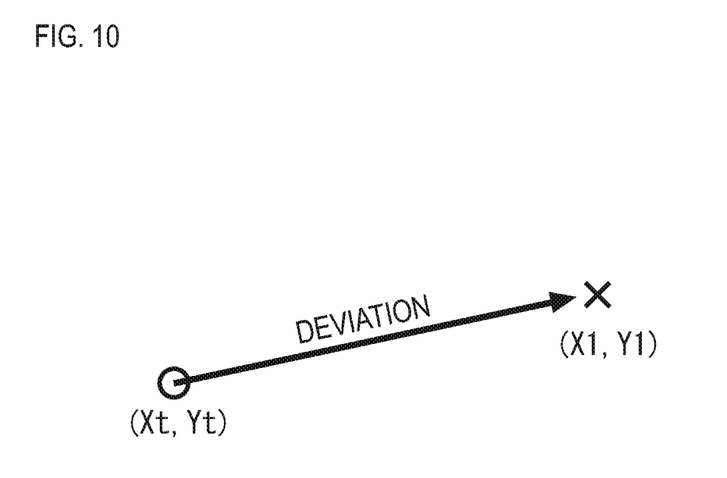
FIG. 10 is a descriptive diagram of correction information applied to a correction process of laying position information.

When the number of GPS satellites captured during positioning is four or more, or when the distance from the reference position is within 100 m, the server device 2 determines that the positioning accuracy by the positioning unit 36 is ensured, and executes the correction process of laying position information. As exemplarily described in FIG. 10, the server device 2 obtains, as the correction information, a deviation between a position (Xt, Yt) indicated by the laying position information and a position (X1, Y1) indicated by the measured position information. Then, the server device 2 executes correction process in which the server device 2 calculates, as exemplarily described in the following formula, a correction amount by multiplying this deviation, which is the correction information, by a weighting coefficient k such as 1/100, and adds the correction amount to the position (Xt, Yt) indicated by the laying position information prior to the correction and obtain a new position (Xn, Yn) corresponding to the correction position information after the correction.

$$(Xn, Yn) = (Xt, Yt) + k\{(X1, Y1) - (Xt, Yt)\}$$ [Formula 1]

On the other hand, on the vehicle 3 side that receives the laying position information in return from the server device 2, when the control unit 32 receives the laying position information (S205), the own vehicle position is calculated with reference to the magnetic marker 10 associated with this laying position information (S206). Specifically, with reference to the laying position information of the magnetic marker 10 indicated by the laying position information, a position is calculated by shifting in the vehicle width direction as much as the lateral shift amount of the magnetic marker 10 measured by the sensor unit 31 and is identified as the own vehicle position.

The control unit 32 inputs the own vehicle position identified by using the laying position information of the magnetic marker 10 to the arithmetic unit 335 of the navigation device 33. The arithmetic unit 335 generates guidance information according to the own vehicle position and travelling direction on the route set in advance and outputs the guidance information by voice or the like.

Here, the own vehicle position input to the arithmetic unit 335 by the control unit 32 is associated with accuracy information of the laying position information as a source. The arithmetic unit 335 switches the route guidance execution program according to whether the accuracy information associated with the own vehicle position indicates low accuracy or high accuracy, and changes the operation mode.

The arithmetic unit 335 executes the above-mentioned first program when the accuracy information associated with the own vehicle position indicates low accuracy, and sets an operation mode in which guidance or the like requiring distance accuracy such as voice guidance for a stop line is not performed. In this operation mode, for example, vocal guidance such as "Turn left at the next intersection" is output in a state in which there is sufficient distance to the intersection.

On the other hand, the arithmetic unit 335 executes the above-mentioned second program when the accuracy information associated with the own vehicle position indicates high accuracy, and identifies the distance to a target object such as the stop line, for example, to set the operation mode to perform various guidance and the like. In this operation mode, voice guidance for alerting the driver, for example, such as "10 m left to the stop line" is executed every 1 m by voice guidance or the like of the position of the stop line or the like at the intersection.

As described above, in the operation of the marker system 1 of this embodiment, after magnetic markers 10 are laid, the accuracy of laying position information of the magnetic marker 10 can be improved through the use of the magnetic marker 10 by the general vehicle 3. On the vehicle 3 side that has detected the magnetic marker 10, the measured position information indicating the position of the magnetic marker 10 is transmitted (uploaded) to the server device 2, whereby higher accurate laying position information can be received in return. On the vehicle 3 side, highly accurate driving assist control can be achieved by acquiring the highly accurate position of the magnetic marker 10.

In the marker system 1, since the accuracy of laying position information can be improved through the use on the general vehicle 3 side, a positional accuracy required when laying magnetic markers 10 is relaxed. In the marker system 1, since it is not necessary to perform highly accurate surveying when laying magnetic markers 10, the laying work can be performed efficiently. In particular, in the case of the magnetic markers 10 are to be laid later in an existing road, a period for closing the road and performing the laying work can be shortened and the social cost which accompanies the laying of magnetic markers 10 can be reduced.

The marker system 1 of this embodiment employs a configuration in which the server device 2 distributes the laying position information of the magnetic marker 10 to the vehicle 3 side. Therefore, it is not necessary to perform the process of selecting the laying position information on the vehicle 3 side, and the processing load can be lessened on the vehicle 3 side.

In addition, since it is not necessary to store the laying position information of each magnetic marker 10 on the vehicle 3 side, the hardware configuration on the vehicle 3 side can be simplified. Furthermore, the latest laying position information stored in the server device 2 can be applied to the control on the vehicle 3 side.

In the marker DB (storage device) 25 of the server device 2, the information indicating the accuracy of laying position information of the magnetic marker 10 is stored in association with the laying position information. The server device 2 returns the information indicating the accuracy of laying position information together with the laying position information so that the vehicle 3, which can perform control of a plurality of two or more, types as the control for assisting driving, can switch the control according to the accuracy of laying position information.

By employing such a configuration, the control can be switched on the vehicle 3 side according to the accuracy of laying position information. As a result, it is possible to avoid in advance a situation in which the control on the vehicle 3 side cannot be performed due to insufficient accuracy of laying position information or erroneous control occurs. For example, at a stage where the accuracy of laying position information cannot be regarded as sufficient, it is preferable to switch to the control that does not require high accuracy of laying position information. With such a configuration, after the magnetic markers 10 are laid, the magnetic marker 10 can be used by the vehicle 3 from the stage where the accuracy of laying position information is not sufficiently high. And the accuracy of laying position information can be improved from an early stage by prompting the use of the magnetic marker 10 on the vehicle side.

In the operation of improving the accuracy of laying position information through the use of the magnetic marker 10 by the general vehicle 3, it is not necessary to run a measuring vehicle that measures the laying position of the magnetic marker 10. After the magnetic markers 10 are laid, the road operation can be switched to normal operation at an early stage, and the period for closing the road can be shortened.

For example, immediately after laying the magnetic markers 10, a measuring vehicle having substantially the same specifications as the exemplarily described vehicle 3 may run among the general vehicles to measure the positions of the magnetic marker 10 to perform work for improving the accuracy of laying position information. In this operation, the accuracy of laying position information can be improved by running the measuring vehicle among the general vehicles without closing the road to the general vehicles. In this embodiment, the configuration in which the laying work vehicle 18 generates the database of laying positions of the magnetic marker 10 was exemplarily described, but the database generation function of the laying work vehicle 18 is not a required configuration. It is also preferable to generate the database serving as a basis for the marker DB 25 by running the above-mentioned measuring vehicle during the normal operation of the road.

Note that, in this embodiment, control for performing route guidance is exemplarily described as the control for assisting driving of the vehicle 3. Instead of this, or in addition, driving assist control such as lane departure warning, lane keeping driving, and/or automatic driving may be used when the vehicle 3 travels in the lane where the magnetic markers 10 are laid. For example, in the case of lane keeping driving, it is preferable to employ a configuration in which the control is switched such as switching between the control limited up to 80 km/h when the accuracy of laying position information is low, and the control in which the target is limited up to 120 km/h when the accuracy is high. Furthermore, for example, according to the accuracy of laying position information, the contents of combinations of control that can be performed may be switched among when only the lane departure warning is performable, when lane departure warning and lane keeping driving are performable, and when all controls including automatic driving are performable. In the case of automatic driving, for example, the control may be employed such that only automatic driving in the driving lane is performable when the accuracy is low, and automatic driving in overtaking lane or automatic driving including automatic overtaking is performable when the accuracy is high.

As for the correction process of the laying position information, in this embodiment, the configuration for switching whether or not to execute correction according to the accuracy of measured position information being high or low is exemplarily described. Instead of this, the positional accuracy of measured position information may be expressed numerically, and a correction coefficient corresponding to a numerical value may be employed. In this case, when the numerical value indicating the accuracy is small and the accuracy is low, the correction coefficient will be small and the degree of correcting the laying position information becomes closer to zero. On the other hand, when the numerical value indicating the accuracy is large and the accuracy is high, the correction coefficient will be large, and the degree of correction becomes large. In this case, a configuration may be achieved in which the degree of correction is continuously varied according to the accuracy, instead of switching between whether or not the correction is executed according to the accuracy. In addition, erroneous correction due to measured position information with low positioning accuracy can be avoided in advance, and the effect of correction process of laying position information can be further enhanced.

In the foregoing, while specific examples of the present invention have been described in detail as in the embodiments, these specific examples each merely disclose an example of technology included in the scope of claims for patent. Needless to say, the scope of claims for patent should not be interpreted in a limited manner by the configuration, numerical values, or the like in the specific examples. The scope of claims for patent includes techniques where the above-mentioned specific examples are modified, changed, or appropriately combined in various ways using publicly known technology and knowledge of those skilled in the art, and so forth.

REFERENCE SIGNS LIST 1 marker system
10 magnetic marker
18 laying work vehicle
2 server device
20 processing circuit
21 acquisition part
22 distribution part
25 marker database, storage device
3 vehicle
31 sensor unit
310 detection processing circuit
32 control unit
33 navigation device
335 arithmetic unit
36 positioning unit

The invention claimed is:

1. A marker system operation method for achieving control for assisting driving of a vehicle by using magnetic markers, the marker system including a storage device which stores laying position information indicating positions where the magnetic markers are laid, the marker system operation method comprising:

by the vehicle, detecting a magnetic marker, measuring a lateral shift amount of the magnetic marker, measuring a position of the vehicle, calculating a position of the magnetic marker based on the lateral shift amount and the measured position of the vehicle;

identifying a magnetic marker positioned nearest to the calculated position of the magnetic marker from among the laying position information stored in the storage device, and providing the laying position information of the identified magnetic marker to the vehicle;

by the vehicle, calculating a position of the vehicle with reference to the magnetic marker associated with the provided laying position information; and correcting the laying position information of the identified magnetic marker stored in the storage device by using, as correction information, the calculated position of the magnetic marker detected by the vehicle.

2. The marker system operation method according to claim 1, wherein the laying position information is provided by associating with information indicating accuracy of laying position information when the laying position information is provided to the vehicle side.

3. The marker system operation method according to claim 1, wherein a degree of correcting the laying position information varies according to positional accuracy when the position of the vehicle is measured.

4. A marker system for achieving control for assisting driving of a vehicle by using magnetic markers, the marker system comprising:
   a storage device configured to store laying position information indicating positions where the magnetic markers are laid;
   a sensor unit configured to detect a magnetic marker and to measure a lateral shift amount of the magnetic marker;
   a positioning unit configured to measure a position of the vehicle;
   a control unit configured to calculate a position of the magnetic marker based on the lateral shift amount and the measured position of the vehicle; and
   a server device configured to identify a magnetic marker positioned nearest to the calculated position of the magnetic marker from among the laying position information stored in the storage device and to provide the laying position information of the identified magnetic marker to the vehicle;
   wherein the control unit is configured to calculate a position of the vehicle with reference to the magnetic marker associated with the provided laying position information; and
   wherein the server device is configured to correct the laying position information of the identified magnetic marker stored in the storage device by using, as correction information, the calculated position of the magnetic marker detected by the sensor unit.

5. The marker system according to claim 4, wherein the processing circuit changes a degree of correcting the laying position information according to accuracy of the measured position information.

6. The marker system according to claim 4, including a distribution part which selects the laying position information indicating a nearest position with respect to the position indicated by the measured position information from among the laying position information stored in the storage device and returns the laying position information to the vehicle as a transmission source of the measured position information.

7. The marker system according to claim 6, wherein the storage device stores information indicating accuracy of the laying position information being associated with the laying position information, and
   the distribution part returns the information indicating the accuracy of laying position information associated with the laying position information so as to allow switching of the control according to the accuracy of laying position information to the vehicle which can perform control of a plurality of, two or more, types as the control for assisting driving.

8. The marker system operation method according to claim 2, wherein a degree of correcting the laying position information varies according to positional accuracy when the position of the vehicle is measured.

9. The marker system according to claim 5, including a distribution part which selects the laying position information indicating a nearest position with respect to the position indicated by the measured position information from among the laying position information stored in the storage device and returns the laying position information to the vehicle as a transmission source of the measured position information.

10. The marker system according to claim 9, wherein the storage device stores information indicating accuracy of the laying position information being associated with the laying position information, and
    the distribution part returns the information indicating the accuracy of laying position information associated with the laying position information so as to allow switching of the control according to the accuracy of laying position information to the vehicle which can perform control of a plurality of, two or more, types as the control for assisting driving.

\* \* \* \* \*